US010725627B2

(12) United States Patent
Chabrier

(10) Patent No.: US 10,725,627 B2
(45) Date of Patent: Jul. 28, 2020

(54) MANAGING INPUTS TO A USER INTERFACE WITH SYSTEM LATENCY

(71) Applicant: International Business Machines Corporation, Armonk, NY (US)

(72) Inventor: Alain Chabrier, Roquefort-les-pins (FR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 229 days.

(21) Appl. No.: 15/383,827

(22) Filed: Dec. 19, 2016

(65) Prior Publication Data

US 2018/0018071 A1   Jan. 18, 2018

(30) Foreign Application Priority Data

Jul. 15, 2016 (EP) .................................. 16382338

(51) Int. Cl.
| G06F 17/00 | (2019.01) |
| G06F 3/00 | (2006.01) |
| G06F 3/0484 | (2013.01) |
| G06F 11/30 | (2006.01) |
| G06F 11/34 | (2006.01) |
| G06F 9/451 | (2018.01) |

(52) U.S. Cl.
CPC ........ *G06F 3/0484* (2013.01); *G06F 3/04842* (2013.01); *G06F 9/451* (2018.02); *G06F 11/3041* (2013.01); *G06F 11/3438* (2013.01); *G06F 2201/81* (2013.01)

(58) Field of Classification Search
CPC ........ G06F 3/0484; G06F 11/30; G06F 11/34; G06F 9/451; H04N 21/44222
USPC .................................................. 715/866, 200
See application file for complete search history.

(56) References Cited

U.S. PATENT DOCUMENTS

| 5,570,113 A * | 10/1996 | Zetts .................... G06F 3/04883 345/156 |
| 5,694,150 A * | 12/1997 | Sigona .................... G06F 3/038 715/856 |
| 7,962,342 B1 * | 6/2011 | Coughlan ............... G10L 15/22 379/201.01 |
| 8,578,283 B2 | 11/2013 | Whytock et al. |
| 8,712,931 B1 * | 4/2014 | Wahlen ................. G06F 3/0237 706/12 |
| 9,201,591 B1 * | 12/2015 | Wardle .................. G06F 3/0488 |
| 9,477,399 B1 * | 10/2016 | Wardle .................. G06F 3/0488 |
| 2005/0154798 A1 * | 7/2005 | Nurmi .................... G06F 1/1626 710/1 |

(Continued)

FOREIGN PATENT DOCUMENTS

WO    2013133977 A1    9/2013

*Primary Examiner* — Manglesh M Patel
(74) *Attorney, Agent, or Firm* — Cantor Colburn LLP; Richard Wilhelm

(57) ABSTRACT

A computer-implemented method for managing user inputs to a user interface includes: activating a timer when a display of the user interface changes; monitoring user inputs to the user interface including noting a first user input after a user interface display change and determining a time elapse of the timer; and comparing the time elapse with a threshold time period and, if the time elapse is less than the threshold time period, disregarding the first user input.

16 Claims, 6 Drawing Sheets

(56) References Cited

U.S. PATENT DOCUMENTS

| | | | |
|---|---|---|---|
| 2010/0241886 A1* | 9/2010 | Ho | G06F 1/3215 713/323 |
| 2011/0157046 A1* | 6/2011 | Lee | G04G 21/08 345/173 |
| 2012/0140117 A1* | 6/2012 | Waites | G08C 17/02 348/563 |
| 2012/0293447 A1* | 11/2012 | Heng | G06F 3/044 345/174 |
| 2012/0299855 A1* | 11/2012 | Nakazawa | G06F 3/0488 345/173 |
| 2013/0063366 A1* | 3/2013 | Paul | G06F 3/0416 345/173 |
| 2013/0076644 A1* | 3/2013 | Escobedo | G06F 3/0488 345/173 |
| 2013/0234929 A1* | 9/2013 | Libin | G06F 3/01 345/156 |
| 2013/0243399 A1* | 9/2013 | Casagrande | H04N 5/782 386/294 |
| 2014/0082534 A1* | 3/2014 | Cleron | G06F 3/048 715/764 |
| 2014/0118281 A1* | 5/2014 | Baker | G06F 3/0418 345/173 |
| 2014/0143676 A1* | 5/2014 | Tan | G06F 3/0484 715/744 |
| 2014/0292641 A1* | 10/2014 | Cho | G06F 3/012 345/156 |
| 2014/0300769 A1* | 10/2014 | Hartford | H04N 1/2133 348/222.1 |
| 2014/0380231 A1 | 12/2014 | Tupper | |
| 2015/0095818 A1* | 4/2015 | Lee | G06F 3/04842 715/765 |
| 2015/0146226 A1* | 5/2015 | Ichiyama | H04N 1/00381 358/1.13 |
| 2015/0301683 A1* | 10/2015 | Yuan | H04M 1/72522 345/178 |
| 2015/0370779 A1* | 12/2015 | Dixon | G06F 3/04883 715/261 |
| 2015/0379558 A1* | 12/2015 | Jancar | G06Q 30/0246 705/14.45 |
| 2016/0018972 A1* | 1/2016 | Merkin | G06F 3/04847 715/762 |
| 2016/0055258 A1* | 2/2016 | Yu | G06F 16/9577 715/201 |
| 2016/0077663 A1* | 3/2016 | Durojaiye | G06F 3/03545 345/173 |
| 2016/0131383 A1* | 5/2016 | Zhao | F24F 11/30 700/276 |
| 2017/0277498 A1* | 9/2017 | Wood, Jr. | G06F 3/1423 |
| 2017/0357358 A1* | 12/2017 | Teutschler | G06F 3/0414 |
| 2018/0024723 A1* | 1/2018 | Vecera | G06F 9/451 |
| 2019/0034075 A1* | 1/2019 | Smochko | G06F 3/04883 |

* cited by examiner

MANAGING INPUTS TO A USER INTERFACE WITH SYSTEM LATENCY

FOREIGN PRIORITY

This application claims benefit of EP Application No. 16382338.8, filed Jul. 15, 2016, which is herein incorporated by reference.

BACKGROUND

Embodiments of the present invention relate to managing inputs to a user interface, and more specifically, to managing inputs to a user interface with system latency.

More and more computer devices are used in daily life. Most devices use user interfaces (UI) to interact with the user, with a screen with multiple components that the user can operate (for example, click, double click, etc.) to perform inputs. Often such user interfaces are touch screens or use a screen pointer operated by an input device such as a mouse or touch pad.

In particular, mobile devices, such as smart phones or tablets, have common characteristics of usage. These characteristics include that they are mobile devices and are often moving during operations. They are often connected to the Internet and many applications interact with a network that by nature has some latency. Such devices generally have a lot of applications installed that are not always perfectly tuned to work together. The devices include central processing units (CPUs), which can quickly become outdated with respect to the new applications, with a resulting potential latency on how the processor reacts to applications and inputs from the user.

SUMMARY

According to a first aspect of the present invention there is provided a computer-implemented method for managing user inputs to a user interface, comprising: activating a timer when a display of the user interface changes; monitoring user inputs to the user interface including noting a first user input after a user interface display change and determining a time elapse of the timer; and comparing the time elapse with a threshold time period and, if the time elapse is less than the threshold time period, disregarding the first user input.

According to a second aspect of the present invention there is provided a system for managing user inputs to a user interface, comprising: a processor and a memory configured to provide computer program instructions to the processor to execute the function of components; a user interface update component for activating a timer when a display of the user interface changes; a user input monitoring component for monitoring user inputs to the user interface including a first input component for noting a first user input after a user interface display change and a timer component for determining a time elapse of the timer; and a threshold comparing component for comparing the time elapse with a threshold time period and, if the time elapse is less than the threshold time period, an input disregarding component disregards the first user input.

According to a third aspect of the present invention there is provided a computer program product for managing user inputs to a user interface, the computer program product comprising a non-transient computer readable storage medium having program instructions embodied therewith, the program instructions executable by a processor to cause the processor to: activate a timer when a display of the user interface changes; monitor user inputs to the user interface including noting a first user input after a user interface display change and determining a time elapse of the timer; and compare the time elapse with a threshold time period and, if the time elapse is less than the threshold time period, disregarding the first user input.

BRIEF DESCRIPTION OF THE DRAWINGS

The subject matter regarded as the invention is particularly pointed out and distinctly claimed in the concluding portion of the specification. Embodiments of the invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

Figure 1:
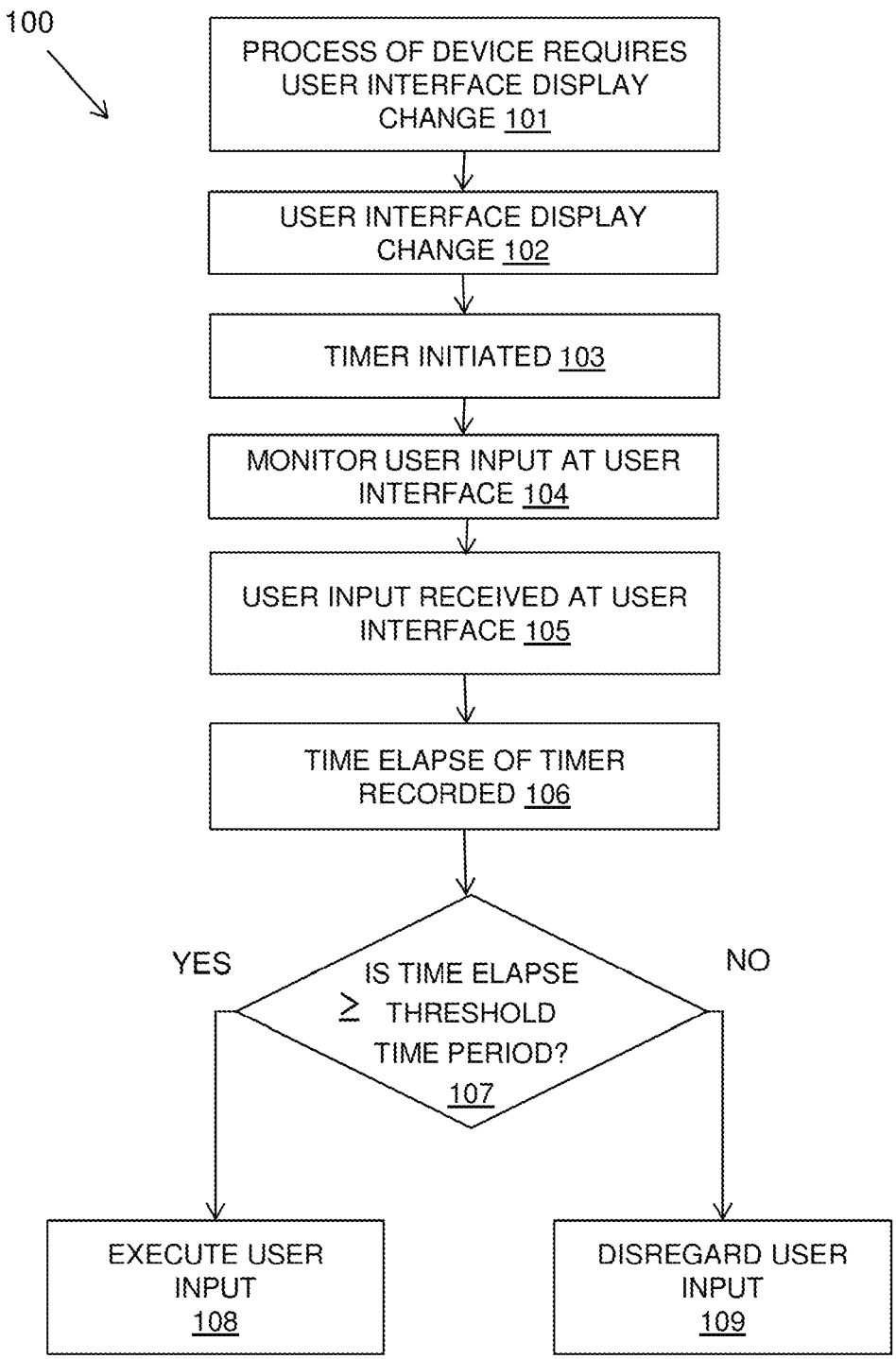
FIG. 1 is a flow diagram of an example embodiment of an aspect of a method in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system are provided for managing user inputs to a user interface of an electronic device. An electronic device may be any form of computing device including smart phones and tablets with touch screen user interfaces and more conventional computing devices such as laptops, desktop computers, etc. with user interfaces in which user inputs are controlled by a pointer device. In one or more cases, a user interface is based on graphical components that the user can act on. A user interacts with the device and the operating system and applications operating on the device using gestures or actions to provide inputs on the device, including clicks on certain icons or portions of the screen.

Unwanted input commands may be received at a user interface when the user interface display changes a very short time before the user action is input. The display may change due to operation of the operating system or applications on the device. The display may change unexpectedly due to a wide range of reasons. For example, a background process may prompt the display change, a notification alert may pop up on the display, a menu of suggestions may be updated, processing of an earlier instruction may be delayed, etc. These display changes may be affected by processing latency that makes the timing of the change unpredictable.

The described method and system reduce the number of undesired actions by taking into account the time elapse from the time at which a current user interface component was created or modified until a user input was requested. A timer is used to record the time passing between the last user interface adaptation and the user input to measure a time elapse. If the time elapse is very short, then the user input is ignored as this has probably been made in error due to a change to the user interface display immediately prior to the user input. Otherwise, if the time elapse is longer, the user input may be executed normally as there would have been time for the user to see the user interface display change before making the user input.

A threshold time period may be configured to which a measured time elapse may be compared. The threshold time period may be adapted taking into account user feedback. The method and system may include adapting the threshold time period used based on user implicit feedback in order to improve the user experience of this method over time. If, after the user input has been executed, it is detected that the user cancels the user input, then the execution of the user input may be considered to be a mistake and the duration for the threshold time period may be increased. If, after the user input has been ignored, the user repeats the same user input, then ignoring the user input may be considered to be a mistake and the duration for the threshold time period may be reduced.

When the time period is not long enough for the user input to be executed with the user having noted the user interface display change, the user may implicitly express the fact that the input was not desired by going back using a back input or cancellation on the user interface of the device. This back input may be considered as a feedback of error and the threshold may be increased.

On the other hand, if the time elapse is smaller than current threshold time period, then the input will not be executed, and if the user really wants to make this input, he or she will re-execute the interaction on the component. In such a case, a decrease in the value of the current threshold time period may be considered for further situations.

Unpredictable changes to the user interface display may be due to latency in the operating system, applications, or network connection. Unpredictable changes may be due to, for example, an application being connected to the Internet and having a delayed response, an application being delayed in opening, an application taking time to process some previous operation, the device having some latency to react to previous user actions, a menu dynamically updating input options, a notification alert being displayed, or content being refreshed, etc. It is common that the user sees some possible actions on the display, however display may be about to change and with it the set of possible actions by modifying the user interface components made available.

Due to this latency, the components may change immediately before the user performs an action, without the user having the ability to be aware of the change and stop the action. The resulting action may not be what the user wants to do, and this results in a negative user experience.

The method and system provide a mechanism to reduce the number of unwanted inputs to a user interface when unpredictable changes happen in the user interface, using a method based on a threshold time period between a user interface display change and a user interface input. Option-ally, the method and system may adapt the threshold time period based on additional user interface input.

Referring to FIG. 1, a flow diagram 100 shows an example embodiment of the described method. The method may be carried out by the device's operating system with native support for the method that may allow inter-application context changes to be managed as well as more generic management of all kinds of user interface changes. In another embodiment, the method may be carried out by an application running on the device.

A process running on the device or some event may require 101 a change to a display of the user interface. This may be due to a previous user input, a background process, a delayed response, a notification alert, a refreshing of content, or any other reason. The user interface display of the device may change 102. In an embodiment in which the method is carried out by an operating system of the device, most user interface element changes have a common entry point that may be monitored. In an embodiment in which the method is carried out by an application, it may be ensured that user interface changes go through a common entry point.

The change may be to the entire display or a portion of the display, such as a menu or window.

At the time of the user interface display change, a timer may be initiated 103. A user input following the user interface display change may be monitored 104. A user input may be a user input, gesture, cancellation of a previous input, typing of input characters, etc. When a user input is received 105 at the user interface, a time elapse since the timer was initiated may be recorded 106. In one embodiment, the user input may be noted if it is received in the portion of the display that has changed.

The time elapse may be compared to the threshold time period. It may be determined 107 if the time elapse is greater than or equal to a threshold time period. If so, the user input may be executed 108. However, if the time elapse is less than the threshold time period, then the user input may be disregarded 109. In another embodiment, it may be determined if the time elapse is less than or equal to the threshold time period, in which case the user input may be disregarded.

Figure 2:
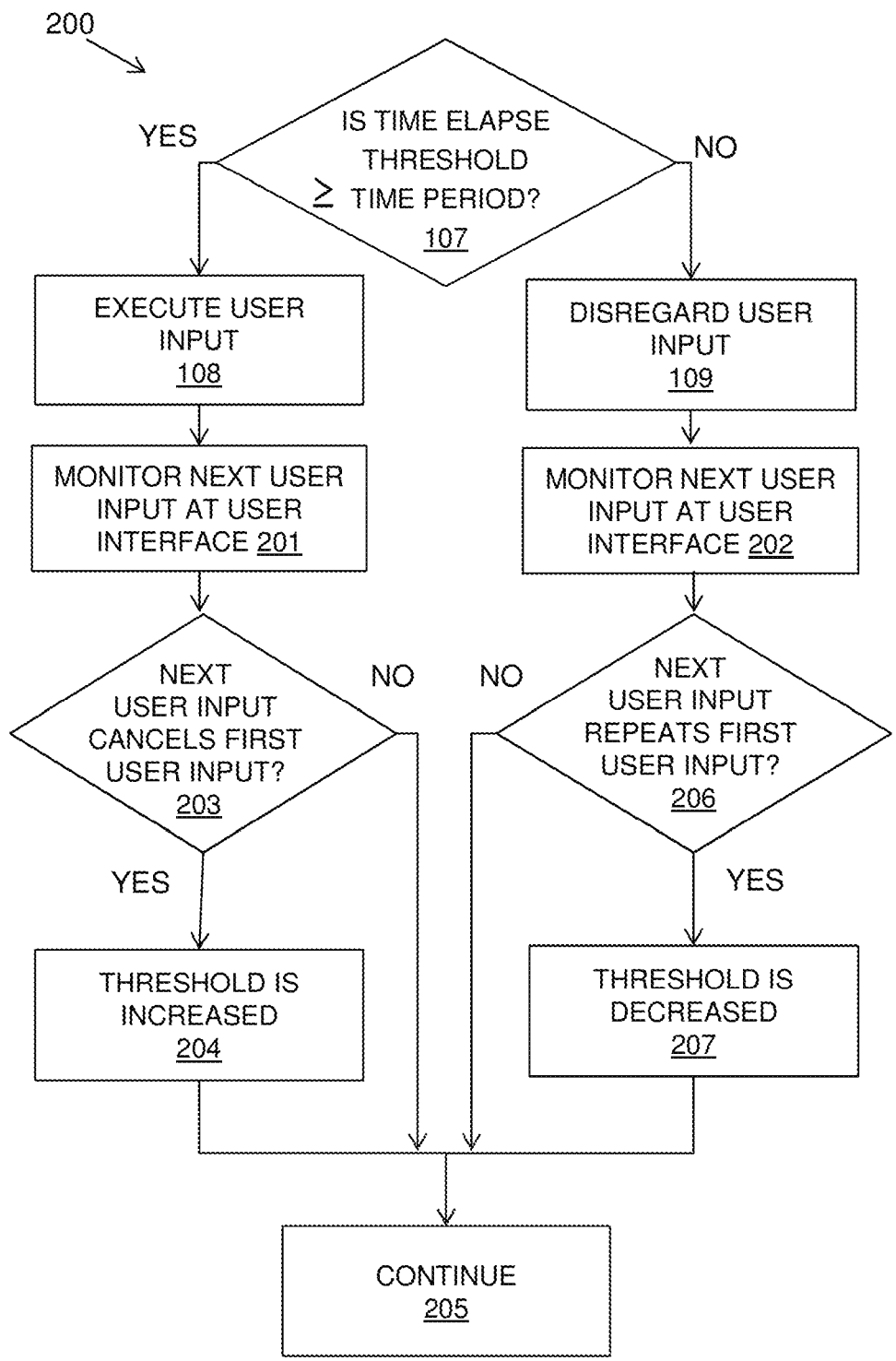
FIG. 2 is a flow diagram of an example embodiment of another aspect of a method in accordance with the present invention.

Referring to FIG. 2, a flow diagram 200 shows an example embodiment of a further optional aspect of the described method of adapting the threshold time period.

The flow diagram 200 of FIG. 2 shows the determination 107 of the time elapse between the user interface display change and the first user input compared to the threshold time period and the two outcomes of executing 108 the user input and disregarding 109 the user input. In one or more cases, a next user input to the user interface may be monitored 201, 202.

In the case that the first user input was allowed to be executed 108, it may be determined 203 if the next user input cancels the first user input. If so, then the threshold time period may be increased 204. This is due to the cancellation of the first user input indicating that the first user input was an error and therefore the threshold time period is not long enough for the user to react to the change in the display. The operation of the device may then continue 205.

In the case that the first user input was disregarded 109, it may be determined 206 if the next user input is repeating the first user input. If so, then the threshold time period may be decreased 207. This is due to the repeat of the user input indicating that the user intended the first user input and the threshold time period is too long as the user had time to react to the new display. The operation of the device may then continue 205.

If the first user input is executed 108 and it is determined that the next user input is not a cancellation of the first user input, then the operation may continue 205. Similarly, if the first user input is disregarded 109 and it is determined that the next user input is not a repeat of the first user input, then the operation may continue 205.

A log of the user inputs may be maintained in order to determine that a first user input was disregarded and a next user input was a repeat, or that a first user input was executed and a next user input was a cancellation. In one embodiment, this may be a buffer of two user inputs and timestamps in order to determine how the threshold time period should be adapted.

An initial threshold time period may be configured and increase or decrease updates may increase or decrease the time period by a configured incremental amount of time.

The threshold time period adaptation may reflect a particular user's reaction times and therefore the feedback may provide a personalization of the user input management.

The threshold time period may therefore be adapted with implicit feedback from the user, as the user may not know he or she is providing feedback and the method may alter the operation without any knowledge of the user, thereby providing an improved experience. After feedback is received, the user's unwanted inputs may be automatically discarded whilst allowing intended user inputs due to the timing of the user's reactions.

The function to estimate whether the duration between the last user interface display change and the user input may be different for different type of inputs, different sizes of components, and different situations. For example, if the device is a mobile phone, it may be moving or stationary, which may be detected by the phone's sensors, and different thresholds may be configured and applied in each case.

Varying threshold time periods may be referenced and used for different types of user inputs, components, applications or situations.

In addition, network quality and/or latency, and processor usage and/or latency may be used and applied to adapt the threshold time period to current temporal situations. For example, if there is a poor network connection, then the latency may be unpredictable and higher threshold time periods may be preferable.

An example of a first use case where the problem may arise is that the user clicks on an item to open a first application and the first application needs some initialization time to start and appear. This time can be significant and perceived by the user, and hence the user may carry out another input on a second application or the operating system whilst waiting for the first application without knowing exactly when the first application will appear with user interface components of the first application being displayed. The first application may change the display just as the user is carrying out the other input on the second application or the operating system.

An example of a second use case is that the user is about to use the device and while he is considering interacting with a currently displayed graphical component, a background application of the device may receive some information (e.g. a notification that new mail is available on the mail server) for which the device is configured to inform the user showing a notification or any other kind of user interface change.

Figure 3A:
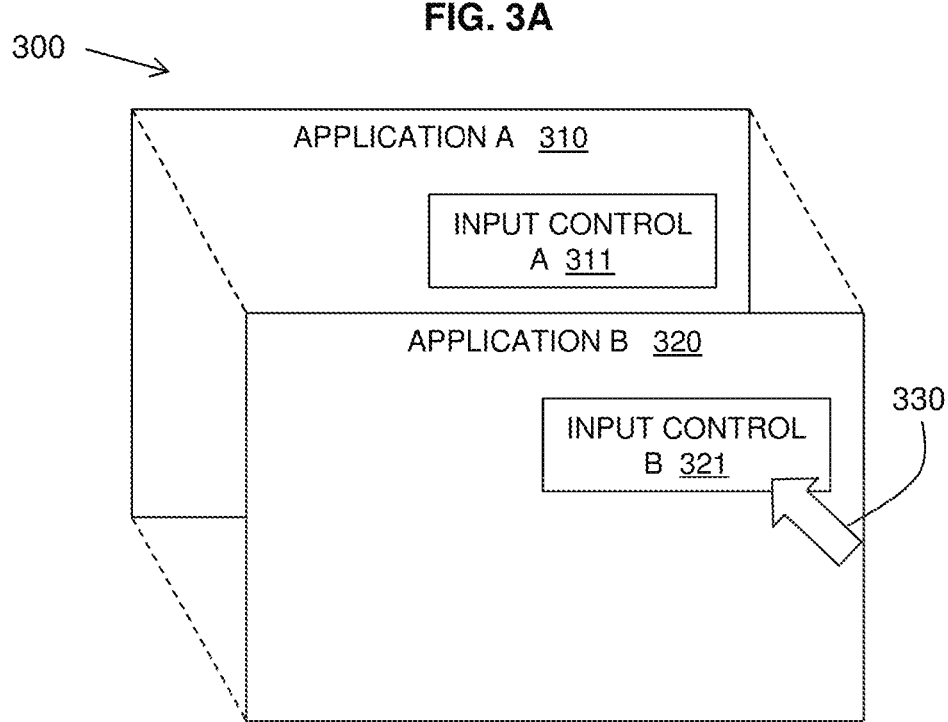
FIGS. 3A and 3B are schematic diagrams illustrating example situations in which one or more embodiments of the present invention may be implemented.

Referring to FIG. 3A, a schematic diagram 300 illustrates a first scenario in which the problem addressed by the described method may arise. A first application A 310 may be displayed on a user interface with a first input control A 311 that may be in the form of an input control such as a checkbox, radio button, input button, toggle, text field, data field, etc.

Just as the user is about to provide a user input 330 to the input control A 311, the user interface may change to display a second application B 320 which has a second input control B 321 in approximately the same position in the user interface as the first input control A 311. The user input 330 to application A 310 may be accidentally received at second input control B 321 of second application B 320.

The time period between the change to the user interface to display the second application B 320 and the user input 330 will be very short and therefore should fall below the threshold time period of the described method and be disregarded.

Figure 3B:
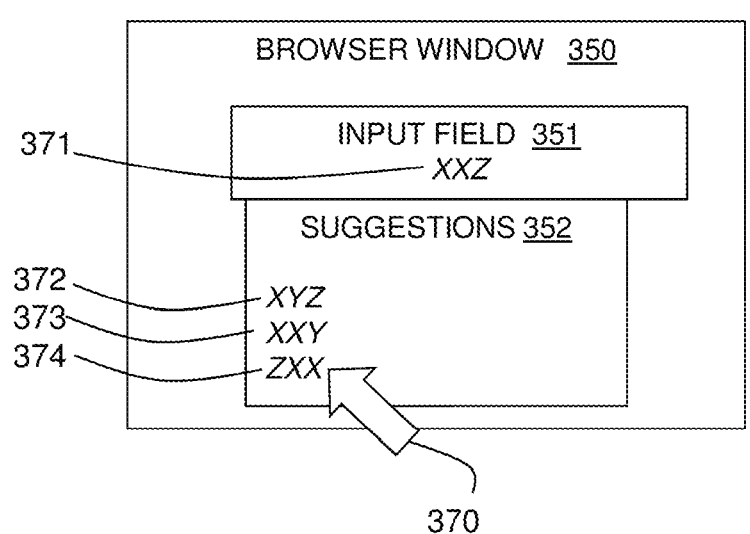

Referring to FIG. 3B, a schematic diagram 360 illustrates a second scenario in which the problem addressed by the described method may arise.

A user interface may display a browser window 350 with a search input field 351 for input of user text 371 for searching. As the user enters the user text 371, a drop-down menu immediately includes suggestions 372-374 based on the user's localization, history of searches, etc. There may be some initial suggestions, but the user may continue typing before they are aware of these suggestions.

As a first letter is typed in the text box of the search input field 351, this is sent to a search server. While the user types, they become aware of the suggestions and wish to choose one by clicking on it.

As the search server has some latency in receiving the input text, it may find better suggestions that are displayed in the dropdown list. A new suggestion may appear in the list on the user interface immediately before the user inputs user input 370 by clicking on the suggestion they wanted to select. The result is that the user selects the new suggestion instead of the one he or she wanted.

As the time period between the change to the user interface to display the updated suggestions and the user input 370 is very short, it should fall below the threshold time period of the described method and be disregarded.

Figure 4:
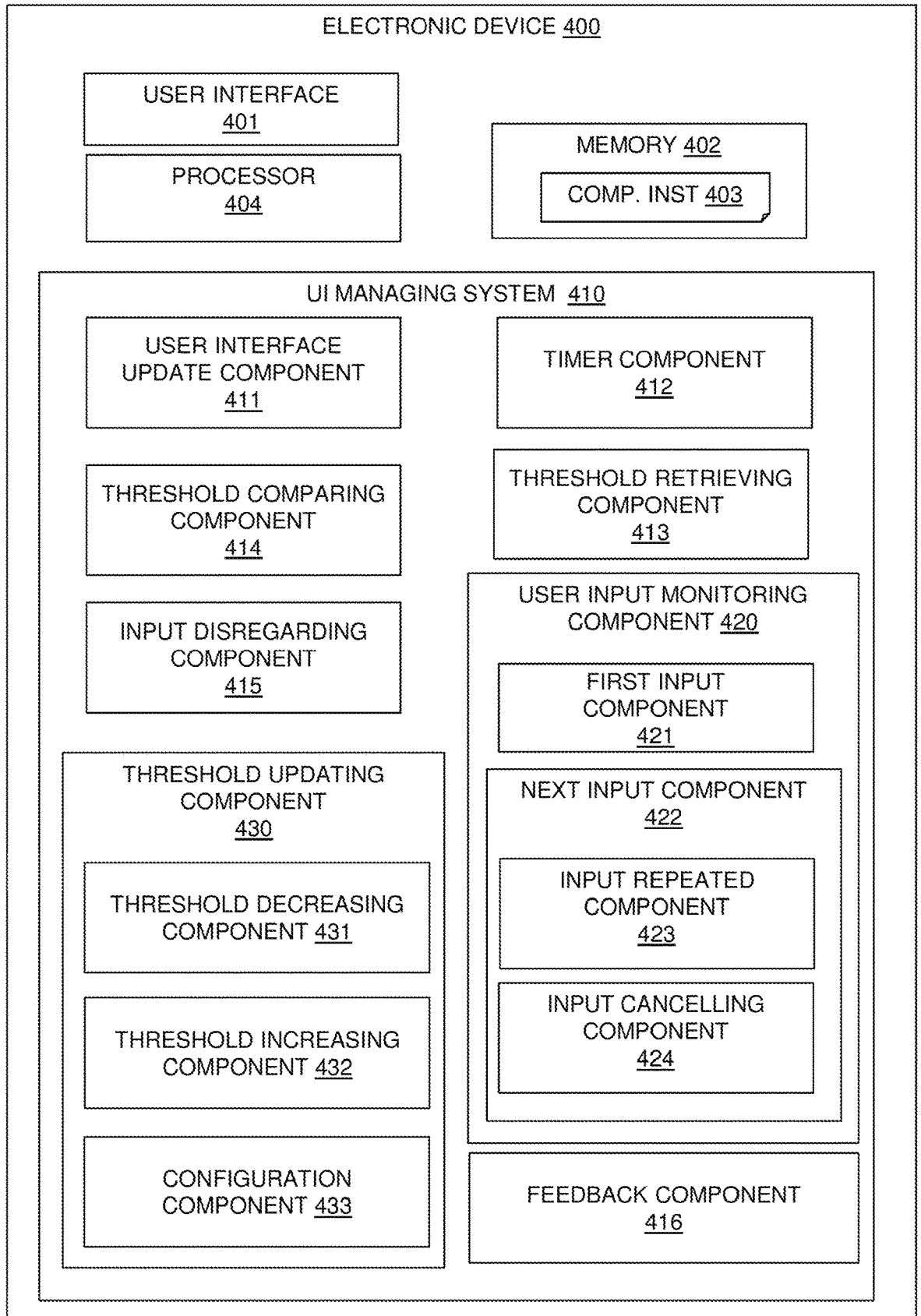
FIG. 4 is block diagram of an example embodiment of a system in accordance with the present invention.

Referring to FIG. 4, a block diagram shows an example embodiment of the described user interface managing system 410 provided at an electronic device 400 having a user interface 401. The user interface 401 may be a touch screen or display with user input via control of a pointer device.

The electronic device 400 may include at least one processor 404, a hardware module, or a circuit for executing the functions of the described components which may be software units executing on the at least one processor. Memory 402 may be configured to provide computer instructions 403 to the at least one processor 404 to carry out the functionality of the components.

The user interface managing system 410 may be incorporated into an operating system or provided as an application, which may be installed on the electronic device 400.

The user interface managing system 410 may include a user interface update component 411 for activating a timer provided by a timer component 412 when the display of the user interface 401 changes. The user interface update component 411 may monitor the user interface 401 to trigger the timer when the user interface display changes.

The user interface managing system 410 may include a user input monitoring component 420 for monitoring user inputs to the user interface 401 including a first input component 421 for noting a first user input after a user interface display change. The timer component 412 may determine the time elapse of the timer at the first user input from the user interface display change.

The user input monitoring component 420 may operate for a portion of the user interface 401 that has changed and user inputs may be managed for the portion of the user interface 401.

The user interface managing system 410 may include a threshold comparing component 414 for comparing a time elapse recorded by the timer component 412 with a configured threshold time period and, if the time elapse is less than the threshold time period, an input disregarding component 415 may disregard the first user input.

The user input monitoring component 420 may further include a next input component 422 for monitoring user inputs to note a next user input. The first input component 421 may record the first user input and whether it was disregarded, and the next input component 422 may record a type of the next user input. The next input component 422 may include an input repeated component 423 for recording that a next input is a repeat of the first input and an input cancelling component 424 for recording that a next input cancels the first input.

The user interface managing system 410 may include a threshold updating component 430 for adjusting the threshold time period based on the next user input type. The user interface managing system 410 may include a feedback component 416 for determining if the first user input has been disregarded and the next user input has repeated the input and providing feedback to decrease the threshold time period. The feedback component 416 may also determine if the first user input has not been disregarded and the next user input cancels the input and provides feedback to increase the threshold time period.

The threshold updating component 430 may include a threshold decreasing component 431 and a threshold increasing component 432 for adjusting the threshold in response to the determination of the feedback component 416.

The threshold updating component 430 may include a configuration component 433 for configuring an initial value of the threshold time period and an incremental value for increasing or decreasing the threshold time period value in response to the feedback.

Multiple threshold time periods may be provided applicable to different types of user input situations, and the user interface managing system 410 may include a threshold retrieving component 413 for determining a type of user input situation and referencing one of the threshold time periods.

The electronic device may be any computer device with a user interface, in particular this may include a communication device such as a smart phone or a computing device, which may be a desktop computer, laptop computer, tablet, or other device.

Figure 5:
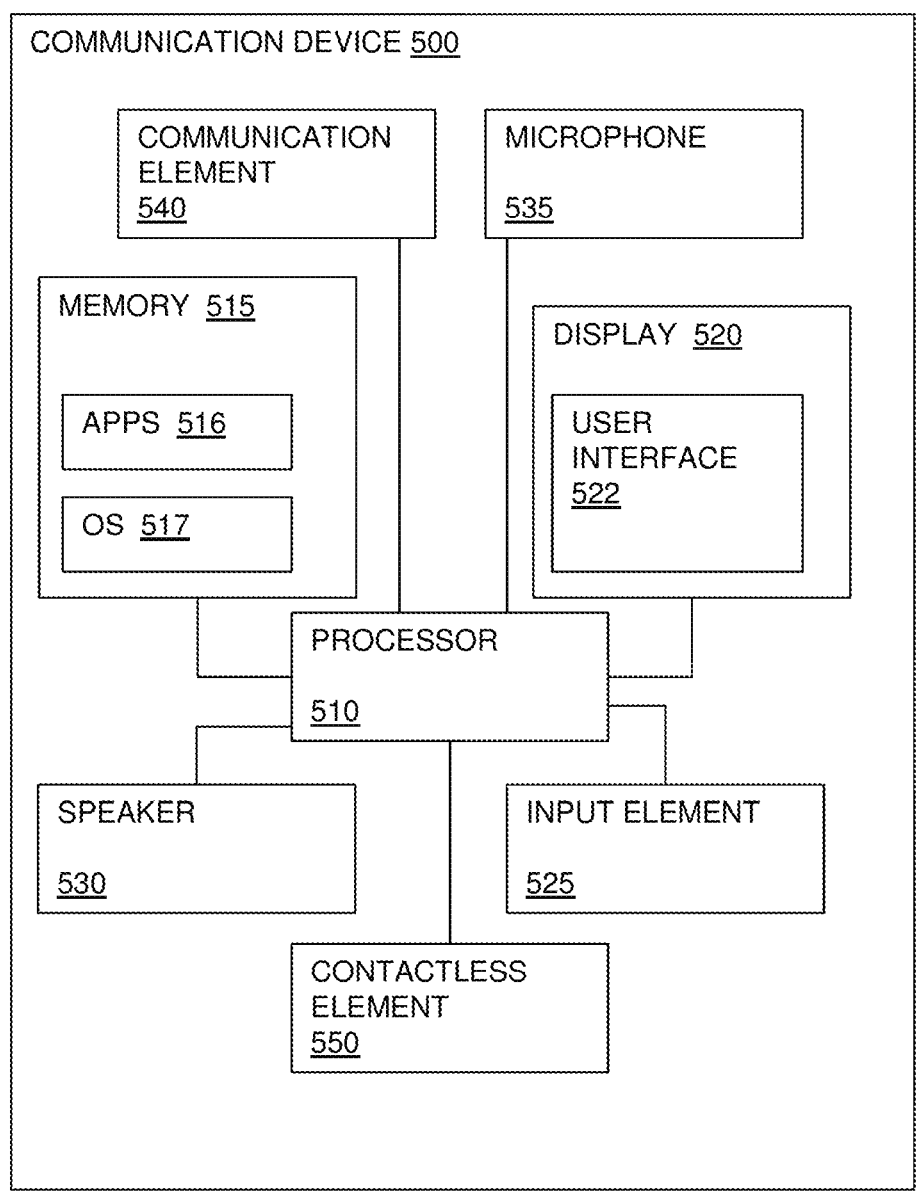
FIG. 5 is a block diagram of a mobile communication device in which one or more embodiments of the present invention may be implemented.

FIG. 5 shows a block diagram of a communication device 500 in which the described method and system may be implemented. The communication device 500 may be a cell phone, a feature phone, a satellite phone, or a computing device having a phone capability, etc.

The communication device 500 may include a processor 510 (e.g., a microprocessor) for processing the functions of the communication device 500 and a display 520 to allow a user to see application displays, operating system information, communication messages, etc. The display 520 may include a user interface 522 in the form of a touch screen.

The communication device 500 may further include an input element 525 to allow a user to input information into the device, for example, using input buttons, a speaker 530 to allow the user to hear voice communication, music, etc., and a microphone 535 to allow the user to transmit his or her voice through the communication device 500.

The processor 510 of the communication device 500 may connect to a memory 515. The memory 515 may be in the form of a computer-readable medium that stores data and computer-executable instructions. The memory 515 may include operating system instructions 517 and application instructions 516.

The communication device 500 may also include a communication element 540 for connection to communication channels (e.g., a cellular telephone network, data transmission network, Wi-Fi network, satellite-phone network, Internet network, Satellite Internet Network, etc.). The communication element 540 may include an associated wireless transfer element, such as an antenna.

The communication element 540 may include a subscriber identity module (SIM) in the form of an integrated circuit that stores an international mobile subscriber identity and the related key used to identify and authenticate a subscriber using the communication device 500. One or more subscriber identity modules may be removable from the communication device 500 or embedded in the communication device 500.

The communication device 500 may further include a contactless element 550, which is typically implemented in the form of a semiconductor chip (or other data storage element) with an associated wireless transfer element, such as an antenna. The contactless element 550 may be associated with (e.g., embedded within) the communication device 500 and data or control instructions transmitted via a cellular network may be applied to the contactless element 550 by means of a contactless element interface (not shown). The contactless element interface may function to permit the exchange of data and/or control instructions between mobile device circuitry (and hence the cellular network) and the contactless element 550.

The contactless element 550 may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device 500 and an interrogation device. Thus, the communication device 500 may be capable of communicating and transferring data and/or control instructions via both a cellular network and near field communications capability.

Figure 6:
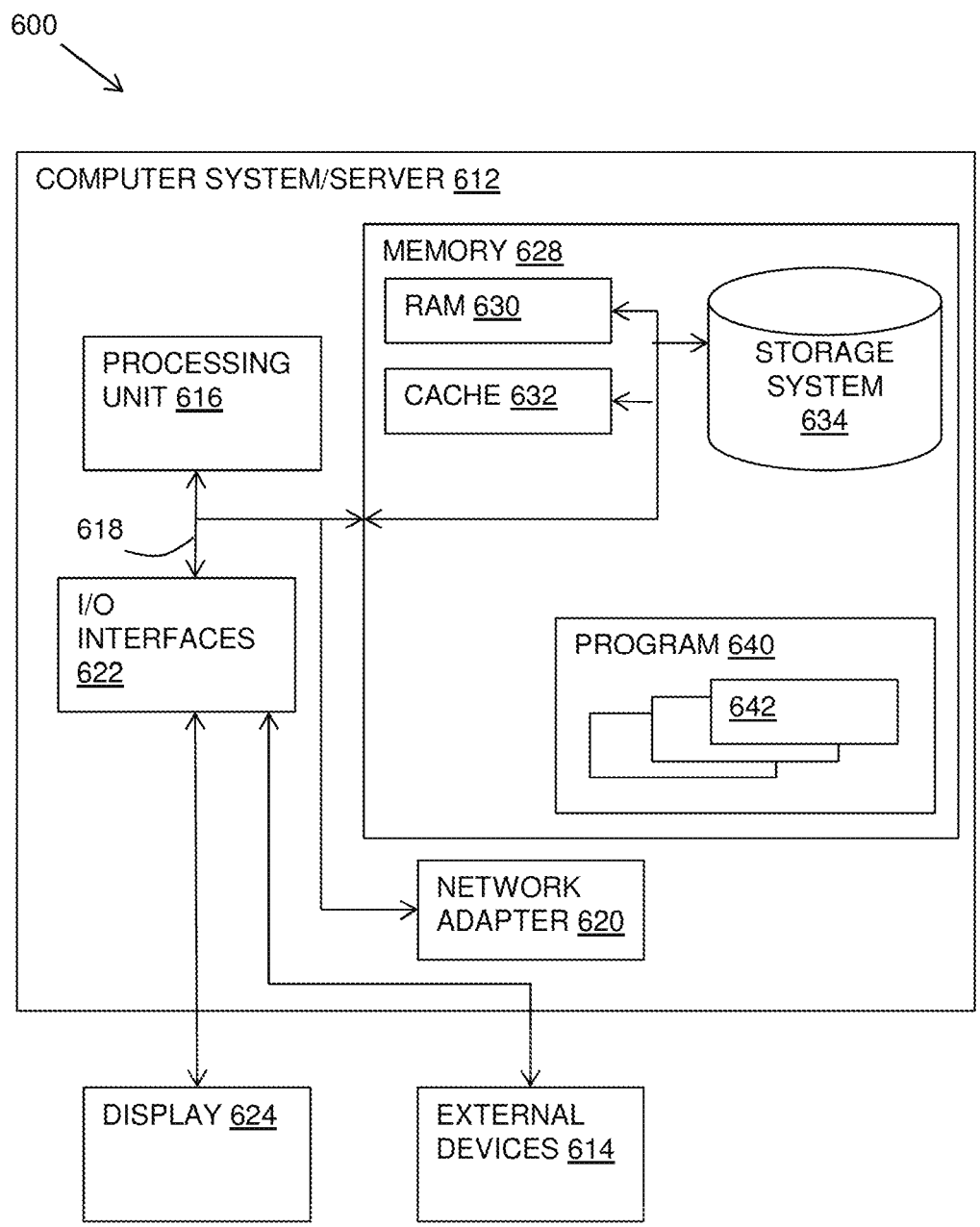
FIG. 6 is a block diagram of a computer system in which one or more embodiments of the present invention may be implemented.

Referring now to FIG. 6, a schematic of an example of a computing device 600 is shown in which the described method and system may be implemented.

The computing device may be a computer system/server 612 that may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in one or more of a local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to the processing unit 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it can include volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more integrated or external devices 614 such as: a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

The invention claimed is:

1. A computer-implemented method for managing user inputs to a user interface, comprising:
    activating a timer based on a determination that a change has occurred to a display of the user interface;
    monitoring user inputs to the user interface for a first user input after the change and determining a time elapse of the timer, wherein the time elapse equals a duration of time between the change and the first user input;
    comparing the time elapse with a threshold time period and, based on a determination that the time elapse is less than the threshold time period, disregarding the first user input;
    monitoring user inputs to the user interface to note a next user input;
    based on a determination that the first user input has been disregarded and the next user input repeats the first user input, decreasing the threshold time period; and
    based on a determination that the first user input has not been disregarded and the next user input cancels the first user input, increasing the threshold time period.

2. The method as claimed in claim 1, including:
    providing feedback based on the next user input to adjust the threshold time period.

3. The method as claimed in claim 2, wherein monitoring user inputs to the user interface records the first user input and whether it was disregarded, and records a type of the next user input.

4. The method as claimed in claim 2, wherein the threshold time period is configured at an initial value and increased or decreased by a configured incremental value in response to the provided feedback.

5. The method as claimed in claim 1, including monitoring a user interface to trigger the timer when the display of the user interface changes.

6. The method as claimed in claim 1, wherein the display of the user interface changes due to one of a group comprising: an application opening, a menu updating input options, a notification alert being displayed, content being refreshed.

7. The method as claimed in claim 1, wherein the method is carried out for a portion of the user interface in which the display of the user interface changes and user inputs are managed for the portion of the user interface.

8. The method as claimed in claim 1, wherein multiple threshold time periods are provided applicable to different types of user input situations, and wherein the method includes determining a type of user input situation and referencing one of the threshold time periods.

9. A system for managing user inputs to a user interface, comprising:
a processor and a memory configured to provide computer program instructions to the processor to execute a function of components;
a user interface update component for activating a timer based on a determination that a change has occurred to a display of the user interface;
a user input monitoring component for monitoring user inputs to the user interface including a first input component for noting a first user input after the change and a timer component for determining a time elapse of the timer, wherein the time elapse equals a duration of time between the change and the first user input;
a threshold comparing component for comparing the time elapse with a threshold time period and, based on a determination that the time elapse is less than the threshold time period, an input disregarding component disregards the first user input;
the user input monitoring component being further configured for monitoring user inputs to the user interface to note a next user input; and
a threshold updating component configured to:
decrease the threshold time period based on a determination that the first user input has been disregarded and the next user input repeats the first user input; and
increase the threshold time period based on a determination that the first user input has not been disregarded and the next user input cancels the first user input.

10. The system as claimed in claim 9, wherein the threshold updating component is further configured for adjusting the threshold time period based on a next user input type.

11. The system as claimed in claim 10, wherein the first input component records the first user input and whether it was disregarded, and the next input component records a type of the next user input.

12. The system as claimed in claim 10, wherein the threshold updating component includes a configuration component for configuring an initial value of the threshold time period and an incremental value for increasing or decreasing the threshold time period value in response to feedback.

13. The system as claimed in claim 9, wherein the user interface update component is for monitoring a user interface to trigger the timer when the display of the user interface changes.

14. The system as claimed in claim 9, wherein the user input monitoring component operates for a portion of the user interface in which the display of the user interface has changed and user inputs are managed for the portion of the user interface.

15. The system as claimed in claim 9, wherein multiple threshold time periods are provided applicable to different types of user input situations, and wherein the system includes a threshold retrieving component for determining a type of user input situation and referencing one of the threshold time periods.

16. A computer program product for managing user inputs to a user interface, the computer program product comprising a non-transient computer readable storage medium having program instructions embodied therewith, the program instructions executable by a processor to cause the processor to:
activate a timer based on a determination that a change has occurred to a display of the user interface;
monitor user inputs to the user interface for a first user input after a user interface display change and determining a time elapse of the timer, wherein the time elapse equals a duration of time between the change and the first user input;
compare the time elapse with a threshold time period and, based on a determination that the time elapse is less than the threshold time period, disregarding the first user input;
monitor user inputs to the user interface to note a next user input;
based on a determination that the first user input has been disregarded and the next user input repeats the first user input, decrease the threshold time period; and
based on a determination that the first user input has not been disregarded and the next user input cancels the first user input, increase the threshold time period.

\* \* \* \* \*